United States Patent
Pirk et al.

(10) Patent No.: US 8,629,635 B2
(45) Date of Patent: Jan. 14, 2014

(54) METHODS FOR OPERATING AN ELECTROSTATIC DRIVE, AND ELECTROSTATAIC DRIVES

(75) Inventors: Tjalf Pirk, Stuttgart (DE); Stefan Pinter, Reutlingen (DE); Joachim Fritz, Tuebingen (DE); Christoph Friese, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 371 days.

(21) Appl. No.: 12/998,669

(22) PCT Filed: Sep. 24, 2009

(86) PCT No.: PCT/EP2009/062352
§ 371 (c)(1),
(2), (4) Date: Jul. 6, 2011

(87) PCT Pub. No.: WO2010/057703
PCT Pub. Date: May 27, 2010

(65) Prior Publication Data
US 2011/0260658 A1    Oct. 27, 2011

(30) Foreign Application Priority Data

Nov. 19, 2008 (DE) .......................... 10 2008 043 836

(51) Int. Cl.
*H01L 41/04* (2006.01)
*H02N 2/14* (2006.01)

(52) U.S. Cl.
CPC ...................................... *H02N 2/14* (2013.01)
USPC ........................... 318/116; 310/308; 310/309

(58) Field of Classification Search
CPC ........................................................ H02N 2/14
USPC .................................... 318/116; 310/308, 309
See application file for complete search history.

(56) References Cited

U.S. PATENT DOCUMENTS

| | | | | |
|---|---|---|---|---|
| 5,986,381 | A * | 11/1999 | Hoen et al. ................... | 310/309 |
| 6,670,738 | B2 * | 12/2003 | Kasahara et al. ............ | 310/309 |
| 2003/0164042 | A1 | 9/2003 | Valentin | |
| 2004/0008396 | A1 | 1/2004 | Stappaerts | |
| 2004/0189144 | A1 | 9/2004 | Gondoh | |
| 2005/0062631 | A1 | 3/2005 | Washburn et al. | |

FOREIGN PATENT DOCUMENTS

| | | |
|---|---|---|
| DE | 10 2005 018 955 | 11/2006 |
| EP | 0 584 479 | 3/1994 |

* cited by examiner

*Primary Examiner* — Bentsu Ro
*Assistant Examiner* — David Luo
(74) *Attorney, Agent, or Firm* — Kenyon & Kenyon LLP (57) ABSTRACT

A method for operating an electrostatic drive having a stator electrode and an actuator electrode which are designed as multilayer electrodes having subunits includes: predeflecting the actuator electrode with respect to the stator electrode from its non-energized starting position into a first end position by applying a first potential to the first stator electrode subunit, and applying a second potential which is different from the first potential to the first actuator electrode subunit, and applying a third potential which is different from the first potential and the second potential, to the second stator electrode subunit and to the second actuator electrode subunit.

15 Claims, 6 Drawing Sheets

Fig. 1A

(Related Art)

METHODS FOR OPERATING AN ELECTROSTATIC DRIVE, AND ELECTROSTATAIC DRIVES

BACKGROUND OF THE INVENTION

1. Field of the Invention

The present invention relates to an electrostatic drive and a method for operating an electrostatic drive.

2. Description of Related Art

Micromechanical components such as micromechanical torsional actuators or translational microactuators, for example, frequently have an electrostatic drive whose electrodes are designed as multilayer electrodes. An electrostatic drive having at least two multilayer electrodes is often referred to as a multilayer comb drive.

Figure 1A:
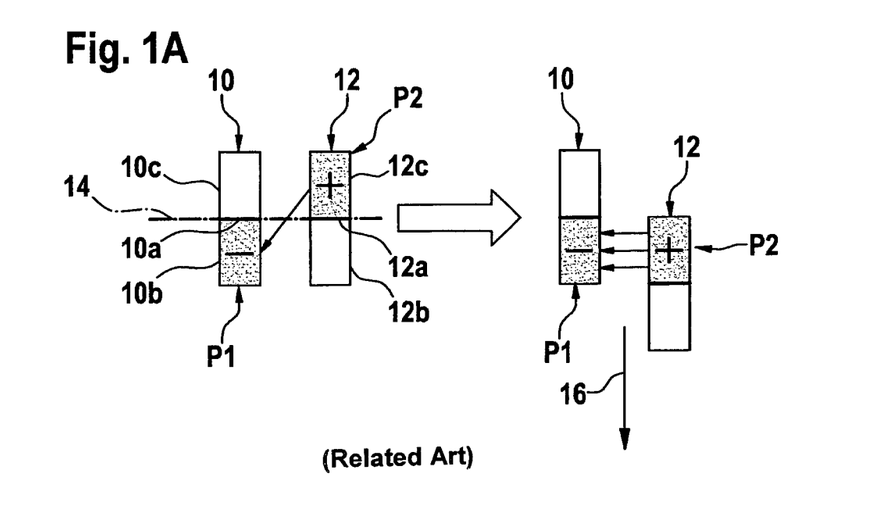
FIGS. 1A and 1B show cross sections for illustrating a design and a mode of operation of a conventional electrostatic drive having multilayer electrodes.
Figure 1B:
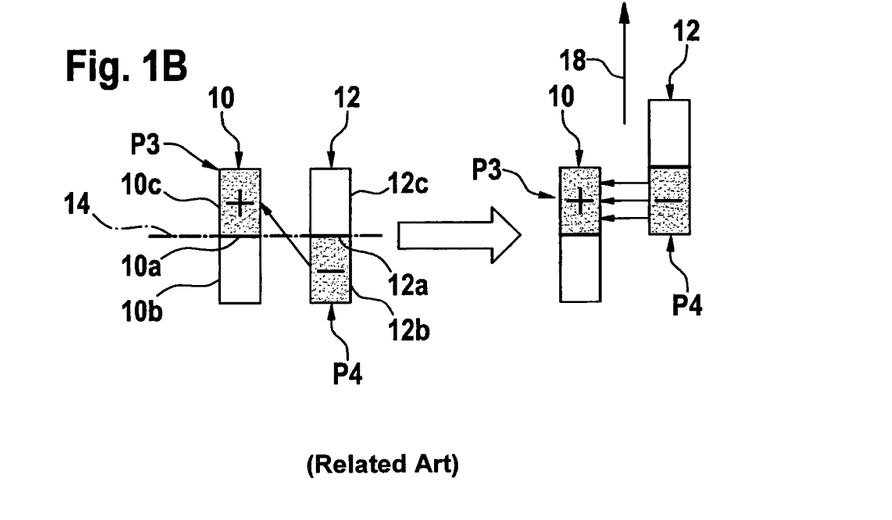

FIGS. 1A and 1B show cross sections for illustrating a design and a mode of operation of a conventional electrostatic drive having multilayer electrodes.

The conventional electrostatic drive has a stator electrode 10 and an actuator electrode 12. The two electrodes 10 and 12 are designed as multilayer electrodes. A first separating layer 10a subdivides stator electrode 10 into two stator electrode subunits 10b and 10c which are electrically insulated from one another. Similarly, actuator electrode 12 is subdivided by a second separating layer 12a into two actuator electrode subunits 12b and 12c which are electrically insulated from one another.

If no voltage which is not equal to zero is applied between stator electrode subunits 10b and 10c and between actuator electrode subunits 12b and 12c, the two separating layers 10a and 12a are situated on a separating plane 14. First stator electrode subunit 10b and first actuator electrode subunit 12b are situated in a first deflection direction 16 of actuator electrode 12 in relation to separating plane 14. Similarly, second stator electrode subunit 10c and second actuator electrode subunit 12c are situated in a second deflection direction 18 of actuator electrode 12 in relation to separating plane 14.

As illustrated in FIG. 1A, applying a first potential P1 to first stator electrode subunit 10b and applying a second potential P2 which is not equal to first potential P1 to second actuator electrode subunit 12c results in a magnetic force between first stator electrode subunit 10b and second actuator electrode subunit 12c, and therefore in a deflection of actuator electrode 12 from its (non-energized) starting position into first deflection direction 16. Similarly, applying a third potential P3 to second stator electrode subunit 10c and applying a fourth potential P4, which is different from third potential P3, to first actuator electrode subunit 12b causes actuator electrode 12 to be displaced from its starting position into second deflection direction 18 (see FIG. 1B).

The illustrated electrostatic drive thus has the advantage that actuator electrode 12 may be moved from its non-energized starting position into two different deflection directions 16 and 18. Second deflection direction 18 is preferably oppositely directed with respect to first deflection direction 16.

The activation method in FIGS. 1A and 1B is known from the related art as the switching electrode actuator (SEA) method. Arbitrary, independent electrical potentials P1 through P4 are applied to various electrode subunits 10b, 10c, 12b, and 12c. With the aid of the electrostatic drive it is thus possible to selectively generate a force in deflection direction 16 or in deflection direction 18.

However, in the activation method in FIG. 1A no defined potential is present at electrode subunits 10c and 12b, which are not actively activated. Similarly, in the activation method in FIG. 1B, electrode subunits 10b and 12c which are not actively activated do not have a defined potential. For this reason, electrode subunits 10c and 12b (FIG. 1A) or 10b and 12c (FIG. 1B) which are not actively activated are also frequently referred to as floating electrode subunits 10c and 12b or 10b and 12c.

However, for a change in direction of actuator electrode 12 which has previously been deflected in first deflection direction 16, a potential which is not equal to zero must be applied to electrode subunits 10c and 12b, which previously have not been actively activated. Thus, an electrical separation between a voltage source (not illustrated) for applying the potential which is not equal to zero and each of electrode subunits 10b, 10c, 12b, and 12c is usually necessary. However, such electrical separation, for example a high-impedance switch, is difficult to implement according to the related art.

BRIEF SUMMARY OF THE INVENTION

The present invention provides advantageous methods for operating an electrostatic drive having at least two multilayer electrodes (multilayer comb drives) such as a SEA drive, for example. This ensures that a deflection direction of the actuator electrode is reliably defined by a targeted use of an asymmetry of the activation potentials.

In one refinement of the methods, the displacement force may be maximized by eliminating or avoiding the asymmetry of the activation potentials after a predeflection. This ensures maximum utilization of the activation voltage with regard to the generated force. In one particularly advantageous specific embodiment of the present invention, only one high-voltage potential is necessary for the activation.

In the methods according to the present invention there is no need for concern about floating electrode subunits. Application of a potential is understood to mean an active application of a potential in order to avoid floating electrode subunits.

For example, the actuator electrode is predeflected with respect to the stator electrode into a first direction in which the first actuator electrode subunit is situated in relation to the second separating layer by applying a second potential to the first actuator electrode subunit which is in a range between the first potential applied to the first stator electrode subunit and the third potential applied to the second stator electrode subunit and to the second actuator electrode subunit. Likewise, the actuator electrode may be predeflected with respect to the stator electrode into a second direction in which the second actuator electrode subunit is situated in relation to the second separating layer by applying a first potential to the first stator electrode subunit which is in a range between the second potential applied to the first actuator electrode subunit and the third potential applied to the second stator electrode subunit and to the second actuator electrode subunit. The actuator electrode may thus be selectively displaced into a first deflection direction or into a second deflection direction, the second deflection direction preferably being oppositely directed with respect to the first deflection direction.

In a further method step, the actuator electrode is further deflected with respect to the stator electrode from the first end position into a second end position by decreasing a difference between the first potential applied to the first stator electrode subunit and the second potential applied to the first actuator electrode subunit. This ensures an advantageous elimination of asymmetry of the activation potentials after the predeflection in order to increase the achievable displacement force.

In addition, the actuator electrode may be further deflected with respect to the stator electrode from the second end position into a third end position by setting the first potential applied to the first stator electrode subunit equal to the second potential applied to the first actuator electrode subunit, and increasing a difference between the third potential applied to the second stator electrode subunit and to the second actuator electrode subunit and the first potential applied to the first stator electrode subunit. A large displacement force is thus achieved in a simple manner.

In one alternative specific embodiment, for predeflecting the actuator electrode with respect to the stator electrode the stator electrode is coupled to a secondary stator electrode, and the actuator electrode is coupled to a secondary actuator electrode, in such a way that the actuator electrode is displaced in relation to the stator electrode by displacing the secondary actuator electrode in relation to the secondary stator electrode, and a deflection voltage which is not equal to zero is applied between the secondary actuator electrode and the secondary stator electrode in order to displace the secondary actuator, electrode. The secondary actuator electrode is electrically insulated from the actuator electrode, and the secondary stator electrode is electrically insulated from the stator electrode. The secondary stator electrode and the secondary actuator electrode are preferably a further electric drive which is designed as an out-of-plane drive, for example. However, the alternative specific embodiment is not limited to the use of an out-of-plane drive. Rather, any type of electric drive may be used for advantageously predeflecting the actuator electrode from its non-energized starting position.

The advantages described in the preceding paragraphs are also ensured for an appropriate electrostatic drive.

Since the actuator electrode in its starting position is situated in the plane of the at least one stator electrode, the at least two electrodes may be produced comparatively easily by etching out the electrodes from a single electrode material layer. Thus, an adjustment of the at least two electrodes to one another is also dispensed with. The electrostatic drive may thus be produced in a cost-effective manner with the aid of a manufacturing method which may be easily carried out, it being ensured that the at least two electrodes are situated at a comparatively small distance from one another. This improves the ratio of the achieved force with respect to the applied voltage, in particular with respect to an electrostatic drive whose actuator electrode in its starting position is situated outside the plane of the at least one stator electrode (out-of-plane configuration).

In a conventional electrostatic drive having multilayer electrodes, the electrode subunits to which a potential is not applied (floating electrode subunits) are not electrically activated. This activation is challenging in terms of circuitry, since in order to achieve a floating state all electrode subunits must be separable from the electrical voltage source in a high-impedance manner. In addition, at least two of the four required activation channels must be designed for applying a high voltage, or a single voltage source having a high-voltage transfer switch downstream must be used. This makes the conventional electrostatic drive having multilayer electrodes comparatively expensive.

It is simpler to have all four electrode subunits connected to a dedicated voltage source at any point in time. Multiple voltage sources are preferably used. However, it is necessary for only one of the voltage sources to be designed for the high voltages used. The micromechanical component having the electrostatic drive may thus be manufactured in a comparatively cost-effective manner.

In addition, the control device of the electrostatic drive is preferably designed in such a way that when the actuator electrode is predeflected with respect to the stator electrode from its non-energized starting position into a first end position the control device switches to the first operating mode, and when the actuator electrode is further deflected with respect to the stator electrode from the first end position into a second end position the control device switches to the second operating mode, and when the actuator electrode is further deflected with respect to the stator electrode from the second end position into a third end position the control device switches to the third operating mode. The method according to the present invention is thus easily transferable to an electrostatic drive.

The deflection direction may also be specified using a further electrode subunit instead of using an asymmetric potential (i.e., an asymmetric voltage). Similarly, a connection is also possible for which the use of floating potentials corresponds to an OOP actuator. It is possible for the floating potentials to not be connected in order to keep the electronics system simple.

By appropriately placing the at least one further electrode subunit and its splitting or separation, the deflection direction may be determined without the need for an asymmetric potential. This approach is advantageous in particular for actuators which are to be deflected in only one direction.

DETAILED DESCRIPTION OF THE INVENTION

FIGS. 2A through 2D show two schematic illustrations and two coordinate systems for explaining one specific embodiment of the electrostatic drive.

Figure 2A:
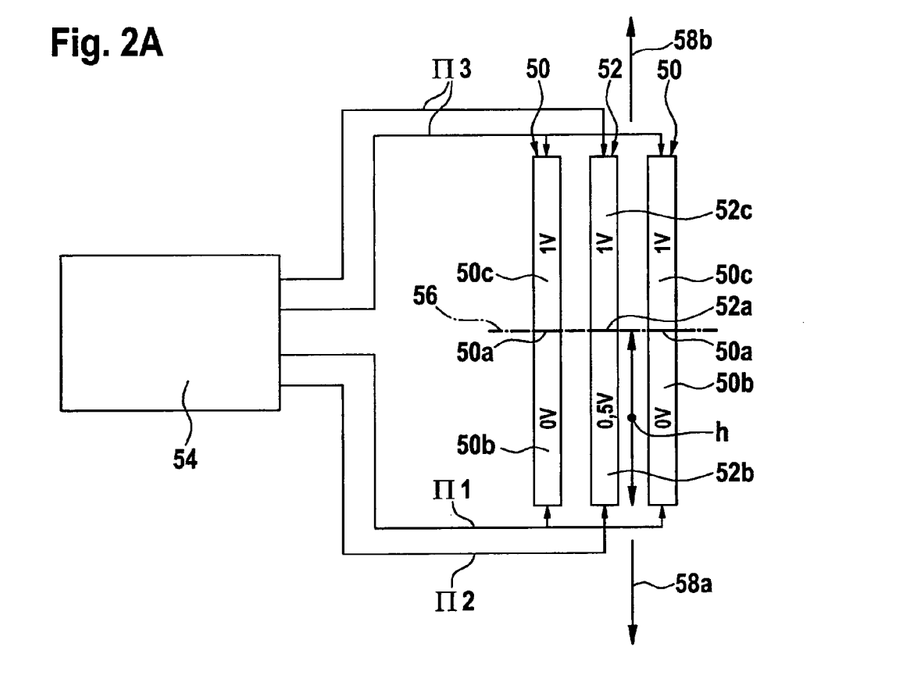
FIGS. 2A through 2D show two schematic illustrations and two coordinate systems for explaining a first specific embodiment of the electrostatic drive.
Figure 2B:
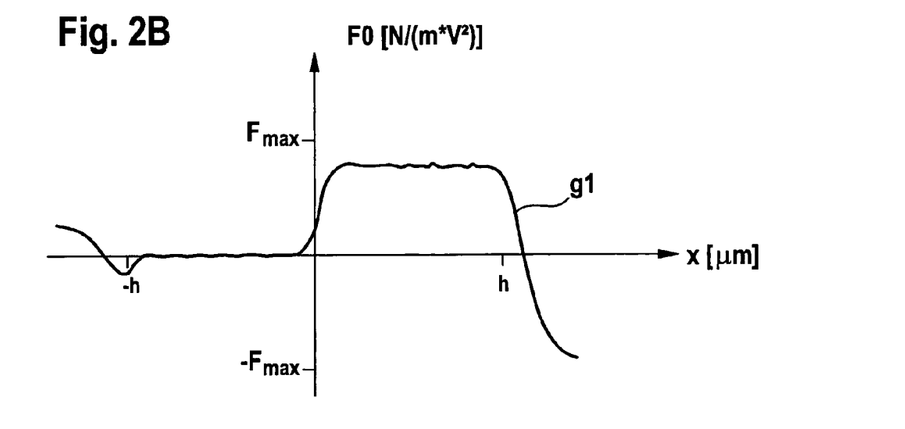
Figure 2C:
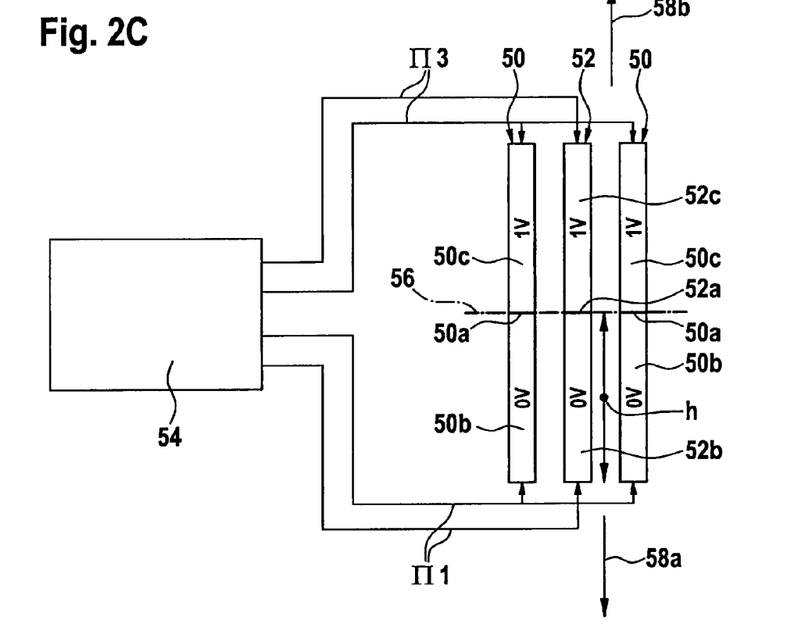

The electrostatic drive schematically illustrated in FIGS. 2A and 2C includes at least one stator electrode 50 and one actuator electrode 52. Electrodes 50 and 52 may be comb electrodes, for example. However, electrodes 50 and 52 are represented only schematically in FIGS. 2A and 2C. It is expressly pointed out here that the present invention is not limited to a specific shape of electrodes 50 and 52.

Electrodes 50 and 52 are designed as multilayer electrodes. The at least one stator electrode 50 is subdivided by a separating layer 50a into two stator electrode subunits 50b and 50c, each having a height h, which are electrically insulated from one another. Similarly, actuator electrode 52 is also subdivided by a separating layer 52a into two actuator electrode subunits 52b and 52c, each having a height h, which are electrically insulated from one another.

However, it is pointed out that the present invention is not limited to two-layer electrodes 50 and 52. Rather, electrodes 50 and 52 may also have at least three electrode subunits which are electrically insulated from one another.

The electrostatic drive includes a control device 54 (only schematically illustrated), with the aid of which a potential $\pi 1$ through $\pi 3$ may be applied to electrode subunits 50b, 50c, 52b, and 52c. If no voltage which is unequal to zero is present between electrode subunits 50b, 50c, 52b, and 52c, actuator electrode 52 is in its starting position. In the non-energized starting position, a first actuator electrode subunit 52b is a shorter distance away from a first stator electrode subunit 50b than a second actuator electrode subunit 52c, first stator electrode subunit 50b being situated in a first deflection direction 58a in relation to separating layer 50a, and first actuator electrode subunit 52b being situated in a first deflection direction 58a in relation to separating layer 52a. On the other hand, a second stator electrode subunit 50c is situated in a second deflection direction 58b in relation to separating layer 50a, and second actuator electrode subunit 52c is situated in a second deflection direction 58b in relation to separating layer 52a. Similarly, in the non-energized starting position the second actuator electrode subunit 52c is a shorter distance away from second stator electrode subunit 50c than the first actuator electrode subunit 52b.

Actuator electrode 52 is preferably situated in relation to the at least one stator electrode 50 in such a way that separating layers 50a and 52a are situated on a shared separating plane 56. This is referred to as an in-plane configuration of electrodes 50 and 52.

Control device 54 has at least two operating modes for applying a potential π1 through π3 to electrode subunits 50b, 50c, 52b, and 52c. In a first operating mode which is referred to below as the asymmetric activation mode, control device 54 is designed to apply a first potential π1 to first stator electrode subunit 50b, and to apply a potential π2 which is different from potential π1 to first actuator electrode subunit 52b. In addition, in the asymmetric activation mode control device 54 is designed to apply a third potential π3, which is not equal to first potential π1 or to second potential π2, to second stator electrode subunit 50c and to second actuator electrode subunit 52c.

Thus, in the asymmetric activation mode second stator electrode subunit 50c and second actuator electrode subunit 52c have the same potential π3. It may therefore be stated that second stator electrode subunit 50c and second actuator electrode subunit 52c have a symmetry with respect to their applied potential π3.

Potential π2 which is applied to first actuator electrode subunit 52b in the asymmetric activation mode may be in a value range, for example, between potentials π1 and π3. (Another example of the distribution of potentials π1, π2, and π3 is described in greater detail below.) It is pointed out here that for a potential π2 in a value range between potentials π1 and π3, it is not important whether potential π1 is less than potential π3, or vice versa.

Potential π2 in a value range between potentials π1 and π3 thus results in an asymmetry between applied potentials π1 and π2 of first stator electrode subunit 50b and first actuator electrode subunit 52b. Potential π2 in a value range between potentials π1 and π3 may therefore be referred to as asymmetric potential π2.

Of course, another electrode subunit of electrodes 50 and 52 may also be acted on by a different potential, which however, entails additional work effort. Such an extension of the asymmetric activation mode is obvious to those skilled in the art by virtue of FIG. 2A, and therefore is not discussed here.

Potentials π1 through π3 are preferably applied to electrode subunits 50b, 50c, 52b, and 52c by applying a voltage between associated electrode subunit 50b, 50c, 52b, or 52c and a ground, not illustrated. In the example in FIG. 2A, these voltages for first stator electrode subunit 50b are 0 V, for first actuator electrode subunit 52b are 0.5 V, and for second stator electrode subunit 50c and second actuator electrode subunit 52c are each 1 V. However, it is pointed out that the values stated here are understood only as examples. In particular, the asymmetric activation mode described here is not limited to an asymmetric voltage which is one-half the difference of the voltages applied to electrode subunits 50b and 52c.

Due to the applied asymmetric potential π2, i.e., due to the asymmetric voltage, the magnetic force between first stator electrode subunit 50b and second actuator electrode subunit 52c is greater than the magnetic force between second stator electrode subunit 50c and first actuator electrode subunit 52b. Applied asymmetric potential π2 thus causes a deflection of actuator electrode 52 with respect to the stator electrode from the non-energized starting position into first deflection direction 58a.

The coordinate system illustrated in FIG. 2B has a deflection x (in μm) along first deflection direction 58a as the abscissa. The ordinate of the coordinate system indicates a normalized force F0 (in N/(m*V2)).

It is apparent from the curve illustrated in FIG. 2B (graph g1) of normalized force F0 that for the described asymmetric activation mode, a force defined by asymmetric potential π2 acts on actuator electrode 52, which is in its starting position for a deflection x=0, via which a direction in which actuator electrode 52 is deflected with respect to stator electrode 50 is unambiguously defined, regardless of slight geometric asymmetries of electrodes 50 and 52. For the voltages indicated in FIG. 2A, this direction is the same as first deflection direction 58a. For the indicated voltages, no positive normalized force F0 which causes actuator electrode 52 to be displaced into second deflection direction 58b acts on actuator electrode 52, which is in its starting position.

However, it is also possible to deflect actuator electrode 52 with respect to stator electrode 50 into second deflection direction 58b by varying applied potentials π1 through π3. For example, a potential π1 is applied to first stator electrode subunit 50b which is in a value range between potential π2 of first actuator electrode subunit 52b and potential π3 of second stator electrode subunit 50c and second actuator electrode subunit 52c. In this case, this may be referred to as an asymmetric potential π1. Due to asymmetric potential π1, the magnetic force between first stator electrode subunit 50b and second actuator electrode subunit 52c is less than the magnetic force between second stator electrode subunit 52c and first actuator electrode subunit 52b. Asymmetric potential π1 thus causes a deflection of actuator electrode 52 with respect to the stator electrode from the non-energized starting position into second deflection direction 58b.

Thus, the asymmetric activation mode has the advantage that the desired direction in which actuator electrode 52 is to be deflected with respect to stator electrode 50 may be easily established.

In the second operating mode illustrated in FIG. 2C, which is referred to below as the symmetric activation mode, control device 54 is designed to apply an identical potential π1 to first stator electrode subunit 50b and to first actuator electrode subunit 52b. In addition, a potential π3 which is different from potential π1 is applied to second stator electrode subunit 50c and to second actuator electrode subunit 52c. Thus, in the second operating mode first stator electrode subunit 50b and first actuator electrode subunit 52b have a "symmetric" potential π1, and second stator electrode subunit 50c and second actuator electrode subunit 52c have a "symmetric" potential π3.

Figure 2D:
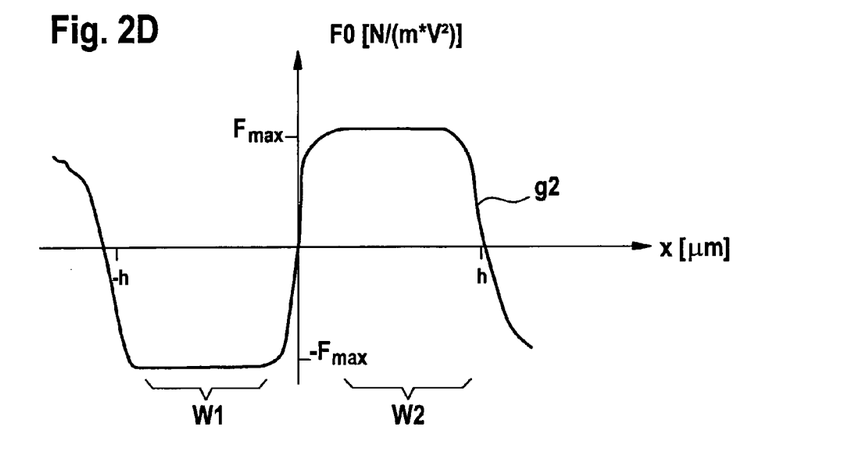

For the symmetric activation mode, the curve illustrated in FIG. 2D (graph g2) of normalized force F0 is obtained via deflection x. The abscissa and the ordinate of the coordinate system in FIG. 2D correspond to the abscissa and the ordinate of the coordinate system in FIG. 2B.

The curve of normalized force F0 for the symmetric activation mode shows distinct plateaus in value ranges W1 and W2 for a greater deflection x in both deflection directions 58a and 58b. It is apparent from a comparison of the coordinate systems in FIGS. 2B and 2D that normalized force F0 in value ranges W1 and W2, having a maximum normalized force Fmax, is much greater than a maximum achievable normalized force F0 in the asymmetric activation mode. Normalized force F0 which is achievable in value ranges W1 and W2 corresponds to an out-of-plane configuration of an electrostatic actuator. In value ranges W1 and W2, the symmetric activation mode is therefore preferred over the asymmetric activation mode.

However, the direction of normalized force F0 reverses at a deflection x of approximately 0. The exact zero point of normalized force F0 may deviate slightly from deflection x=0. For example, the zero point of normalized force F0 is defined by asymmetries in the geometry of electrodes 50 and 52, which are often caused by variations in the manufacturing process. (However, the asymmetry with respect to normalized force F0 is not represented in FIG. 2D.)

With the aid of an asymmetry which is artificially introduced during manufacture of electrodes 50 and 52, it is thus possible to establish the direction of the deflection of actuator electrode 52 with respect to stator electrode 50 from its non-energized starting position. However, it is no longer possible to cancel such an establishment of deflection direction 58a or 58b during operation of the electrostatic drive having electrodes 50 and 52. Thus, for example, after establishment of first deflection direction 58a it is not possible to displace actuator electrode 52 from the starting position into second deflection direction 58b. This limits the possible uses of such an electrostatic drive.

Control device 54 is therefore designed to carry out a predeflection of actuator electrode 52 from its non-energized starting position with respect to the stator electrode in the asymmetric activation mode. Desired deflection direction 58a or 58b is thus established via a corresponding asymmetric potential $\pi 1$ or $\pi 2$. This establishment of desired deflection direction 58a or 58b may be carried out continually during operation. Thus, a one-time selection of first deflection direction 58a does not prevent a subsequent selection of second deflection direction 58b.

It is apparent from a comparison of the coordinate systems in FIGS. 2B and 2D that the achievable maximum normalized force F0 in the asymmetric activation mode is much smaller than the achievable maximum normalized force F0 in the symmetric activation mode. It is therefore not meaningful to maintain the asymmetric activation mode over the entire range of deflection x of actuator electrode 52 into a fixed deflection direction 58a or 58b.

The change from the asymmetric activation mode to the symmetric activation mode is preferably made via an intermediate activation mode in which applied potentials $\pi 1$ and $\pi 2$ approach one another. The asymmetry between applied potentials $\pi 1$ and $\pi 2$ is eliminated incrementally or continuously, for example. If applied potentials $\pi 1$ and $\pi 2$ are (approximately) equal, control device 54 is switched from the intermediate activation mode to the symmetric activation mode. Alternatively, however, it is possible to go directly from the asymmetric activation mode to the symmetric activation mode by abruptly setting applied potentials $\pi 1$ and $\pi 2$ to be equal.

Actuator electrode 52 is subsequently further deflected by controlling applied potentials $\pi 1$ and $\pi 3$ in the symmetric activation mode in such a way that a difference between applied potentials $\pi 1$ and $\pi 3$ increases. Use is thus made of the fact that a larger normalized force F0 may be achieved via the symmetric activation mode (see FIGS. 2B and 2D).

The electrostatic drive illustrated with reference to FIGS. 2A through 2D may be used in a micromechanical component. A torsional actuator such as a micromirror is one example of such a micromechanical component. The electrostatic drive may also be used in a translational actuator, in which a force is generated perpendicularly to a chip surface.

Examples of possible fields of application of the electrostatic drive are a head-up display in the automotive sector and a miniprojector in the consumer sector. Use of the electrostatic drive in a surface scanner or in a switching mirror of an optical network (optical crossconnect) is also conceivable.

Figure 3A:
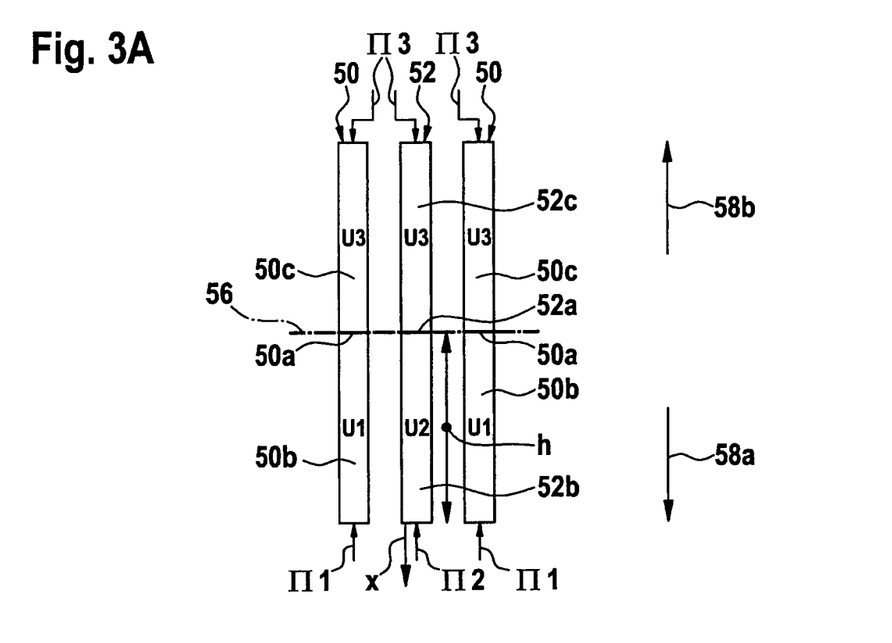
FIG. 3A through 3C show a schematic illustration and two coordinate systems for explaining one specific embodiment of the method for operating an electrostatic drive.
Figure 3B:
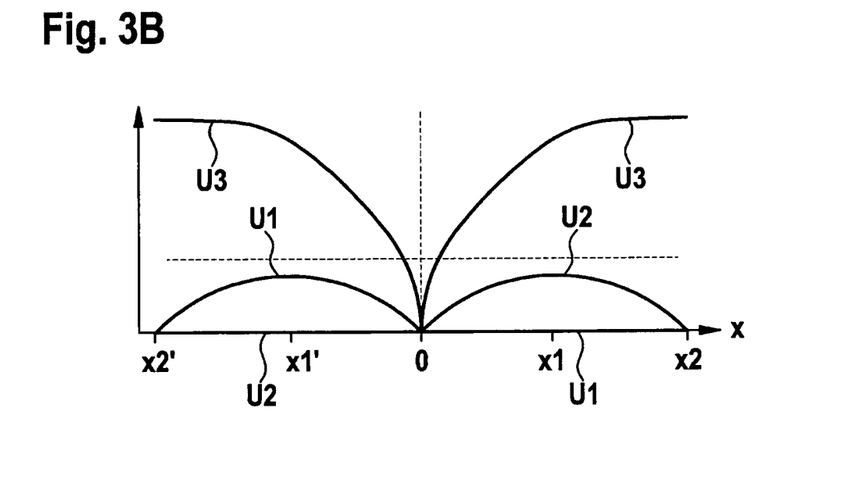
Figure 3C:
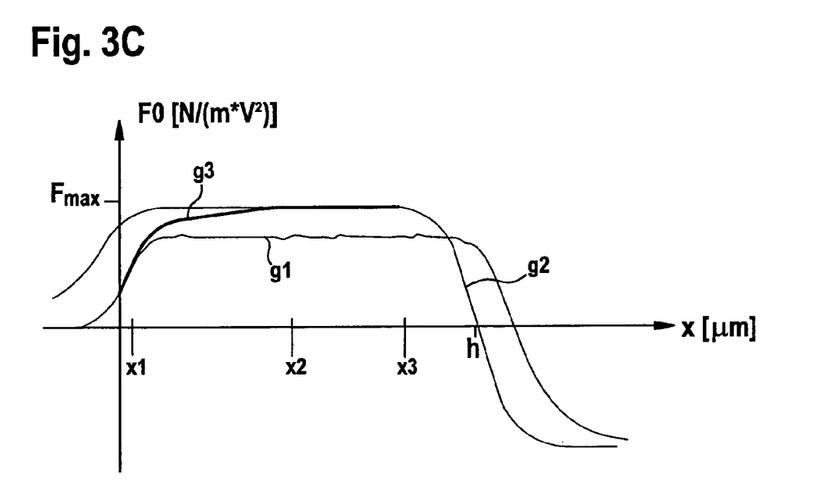

FIGS. 3A through 3C show a schematic illustration and two coordinate systems for explaining one specific embodiment of the method for operating an electrostatic drive.

The electrostatic drive schematically represented in FIG. 3A has the previously described design of electrodes 50 and 52 as multilayer electrodes. If no voltage U1 through U3 is present between electrode subunits 50b, 50c, 52b, and 52c, actuator electrode 52 is in its starting position with respect to the two stator electrodes 50. In the non-energized starting position of actuator electrode 50, separating layers 50a and 52a are preferably situated in a separating plane 56. First stator electrode subunits 50b and first actuator electrode subunit 52b are situated in a first deflection direction 58a in relation to separating plane 56. Similarly, second stator electrode subunits 50c and second actuator electrode subunit 52c are situated in a second deflection direction 58b in relation to separating plane 56.

The time sequence of the illustrated method may be explained with reference to FIG. 3B. The abscissa of the coordinate system in FIG. 3B is a deflection x by which actuator electrode 52 is displaced from its non-energized starting position by applying a voltage U1 through U3 to electrode subunits 50b, 50c, 52b, and 52c. (In the illustrated specific embodiment, the potential is applied by applying voltages U1 through U3 between an associated electrode subunit 50b, 50c, 52b, or 52c and a ground, not illustrated). The ordinate of the coordinate system represents applied voltages U1 through U3.

The coordinate system illustrated in FIG. 3C indicates the curve of normalized force F0 along deflection x as graph g3. The abscissa corresponds to deflection x (in $\mu$m). The ordinate indicates normalized force F0 (in N/(m*V2)). For better illustration of the method described here for operating an electrostatic drive, graphs g1 and g2 in FIGS. 2B and 2D, respectively, are plotted in the coordinate system in FIG. 3C.

For a deflection of actuator electrode 52 from its non-energized neutral position having a deflection x=0, voltages U1 through U3 are applied to electrode subunits 50b, 50c, 52b, and 52c. Voltages U1 through U3 are applied corresponding to the asymmetric activation mode described above, which is suitable for small deflections x for which x1'<x<x1.

For predeflecting actuator electrode 52, a first voltage U1 is applied between first stator electrode subunits 50b and the ground. Second voltage U2 is applied to first actuator electrode subunit 52b, an asymmetry being present between voltages U1 and U2 which is described in greater detail below. In particular, a desired deflection direction 58a or 58b may be established in this way with the aid of asymmetric voltage U2.

On the other hand, a third voltage U3 is applied between a ground and second stator electrode subunits 50c and second actuator electrode subunit 52c in each case. Electrode subunits 50c and 52c thus have a symmetry with respect to their applied voltage U3.

First voltage U1 is preferably held constant at 0 V when actuator electrode 52 is displaced from its starting position into the first end position having deflection x1. In contrast, third voltage U3 continuously increases. For a deflection x between 0 and x1, second voltage U2 is continuously increased, but is in a range between voltages U1 and U3.

Up to deflection x=x1, graph g3 coincides with graph g1 in the asymmetric activation mode. Use is made of the fact that normalized force F0 which is achievable with the aid of the above-described method step may be unambiguously established for a desired deflection direction 58a or 58b.

After reaching the first end position having deflection x1, actuator electrode 52 is further deflected in a method step corresponding to the above-described intermediate mode, which represents a transition from the asymmetric activation mode to the symmetric activation mode. (This transition is selected for the further deflection of actuator electrode 52 for reaching a deflection x>x1, since with the aid of the symmetric activation, for these large deflections for which x>x2 a larger normalized force F0 may be generated in relation to the applied voltage.)

For the further deflection of actuator electrode 52 from the first end position having deflection x=x1 into a second end position having deflection x=x2, first voltage U1 continues to be held constant at 0 V. Second voltage U2 is decreased, and thus approaches first voltage U1. Second voltage U2 may be decreased continuously or incrementally. Third voltage U3 is increased, or is held constant while second voltage U2 is decreased. It is pointed out here that second voltage U2 may in the meantime also be held constant while third voltage U3 is increased.

The method step described in the preceding paragraph causes achieved normalized force F0 to increase (see graph g3 in FIG. 3C). For example, this increase in achieved normalized force F0 may be utilized to apply comparatively small voltages U1 through U3 to electrode subunits 50b, 50c, 52b, and 52c.

Beyond deflection x=x2, voltages U1 and U2 both have the same value, for example a voltage U1=0 V. For a further displacement of actuator electrode 52 from the second end position having a deflection x=x2 into a third end position having a deflection x=x3, voltages U1 and U2 are kept equal. An asymmetry with respect to voltages U1 and U2 is thus no longer present for a deflection x>x2. It is preferred that only voltage U3 increases during the further deflection of actuator electrode 52.

For a deflection x2<x<x3, graph g3 coincides with graph g2 in the symmetric activation mode. For the displacement of actuator electrode 52, maximum normalized force Fmax is thus obtained. The method described here, corresponding to a combination of the asymmetric activation mode and the symmetric activation mode, is therefore particularly advantageous.

As is apparent with reference to FIG. 3B, with the aid of the method described here it is also possible to displace actuator electrode 52 into a second deflection direction. This is a significant advantage of the method described here, compared to an out-of-plane (OOP) actuator.

An OOP actuator having two deflection directions requires two separate comb drive regions, each of which is used for only one deflection direction. In contrast, the method described here requires only one comb drive region, which is usable for both deflection directions 58a and 58b. This allows the size of the electrostatic drive to be reduced while maintaining the number of possible deflection directions 58a and 58b. In particular, it is thus ensured that an electrostatic drive operated with the aid of the method may be more easily inserted into a micromechanical component.

For a displacement of actuator electrode 52 from the non-energized starting position having a deflection x=0 to a deflection x=x1', voltage U2 is held constant at 0. Voltage U3 is increased. Asymmetric voltage U1 is selected in a range between voltages U2 and U3, voltage U1 being continuously increased. A desired deflection direction is thus ensured which allows actuator electrode 52 to be displaced into deflection x=x1' instead of deflection x=x1.

Beyond deflection x=x1', voltage U1 is continuously decreased while voltage U2 is held constant and voltage U3 is continuously increased. After reaching a deflection x=x2', voltages U1 and U2 are held at the same value and voltage U3 is increased.

Figure 4:
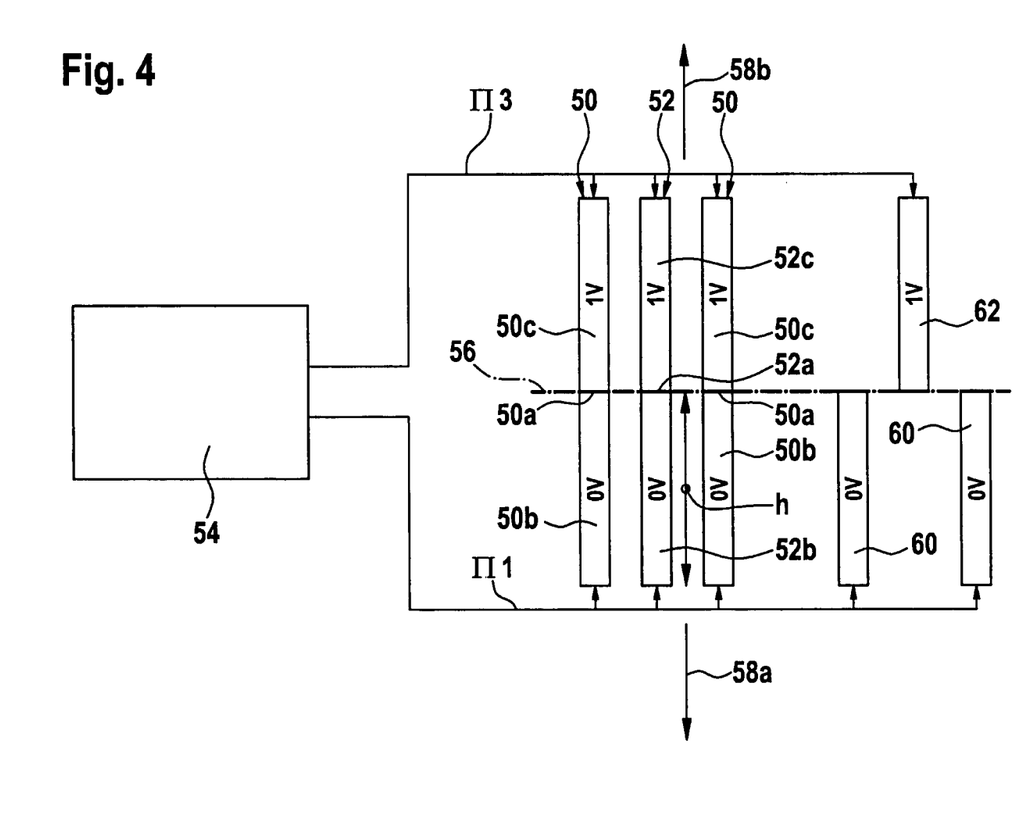
FIG. 4 shows a schematic illustration for explaining a second specific embodiment of the electrostatic drive.

The method described in the preceding paragraphs may be carried out with the aid of a comparatively inexpensive control device. For example, the control device has four voltage sources for applying voltages U1 through U3. Voltages U1 and U2 remain comparatively low over the entire range of deflection 0<x<x3. For large deflections x>x2 or x<x2', only the curve of voltage U3 may require high electrical potentials. The method may thus be carried out using only one high-voltage source. Besides dispensing with further costly high-voltage sources, this also eliminates the need for providing a larger quantity of feed lines having suitable insulation for connecting the further high-voltage sources. FIG. 4 shows a schematic illustration for explaining a second specific embodiment of the electrostatic drive.

The electrostatic drive schematically represented in FIG. 4 includes previously described components 50 through 54. The electrostatic drive also has a secondary stator electrode 60 which is coupled to stator electrode 50, and a secondary actuator electrode 62 which is coupled to actuator electrode 52. Secondary electrodes 60 and 62 are (directly or indirectly) coupled to electrode 50 or 52, respectively, in such a way that actuator electrode 52 may be displaced relative to stator electrode 50 by displacing secondary actuator electrode 62 relative to secondary stator electrode 60.

Secondary stator electrode 60 and secondary actuator electrode 62 result, for example, in a further electrostatic drive which is operable via control device 54. Secondary stator electrode 60 and secondary actuator electrode 62 are preferably designed as an out-of-plane (OOP) drive. In particular, secondary electrodes 60 and 62 may have an overall height which is equal to height h of electrode subunits 50b and 52b or 50c and 52c. Such an OOP drive has the advantage that, concurrently with the structuring of electrodes 50 and 52, it may be structured from two shared electrode material layers having at least one electrically insulating partial layer therebetween. However, by suitably selecting the etching mask it may be ensured that secondary electrodes 60 and 62 are formed as single-layer electrodes. An appropriate manufacturing method is obvious to those skilled in the art based on the preceding description and FIG. 4, and therefore is not discussed in greater detail.

However, it is pointed out that the specific embodiment described here is not limited to secondary electrodes 60 and 62, which in their non-energized starting position are configured with respect to one another in the OOP system. Rather, other specific embodiments of secondary electrodes 60 and 62 may be used for predeflecting electrodes 50 and 52 from their non-energized starting position.

A deflection direction 58a or 58b of actuator electrode 52 is also established by applying a deflection voltage between secondary electrodes 60 and 62. For example, for this purpose potentials π1 and π3 are applied to corresponding secondary electrode 60 and 62. Of course, other potentials may also be applied for applying the deflection voltage to secondary electrodes 60 and 62. Thus, also for a symmetric activation mode, actuator electrode 52 may be displaced in a previously established deflection direction 58a or 58b. The advantages of the symmetric activation mode described in the preceding paragraphs may therefore be realized using the specific embodiment described with reference to FIG. 4.

What is claimed is:

1. A method for operating an electrostatic drive having a stator electrode and an actuator electrode each configured as a multilayer electrode, wherein at least one first separating layer subdivides the stator electrode into at least one first stator electrode subunit and one second stator electrode subunit, and wherein at least one second separating layer subdivides the actuator electrode into at least one first actuator electrode subunit and one second actuator electrode subunit, and wherein the actuator electrode in a non-energized starting position, without a voltage applied between the stator electrode and the actuator electrode, is situated with respect to the stator electrode in such a way that the first actuator electrode subunit is a shorter distance away from the first stator electrode subunit than the second actuator electrode subunit, the method comprising:
predeflecting the actuator electrode with respect to the stator electrode from the non-energized starting position of the actuator electrode into a first end position by performing the following:
applying a first potential to the first stator electrode subunit;
applying a second potential, which is different from the first potential, to the first actuator electrode subunit; and
applying a third potential, which is different from the first potential and the second potential, to the second stator electrode subunit and to the second actuator electrode subunit.

2. The method as recited in claim 1, wherein, by applying the second potential to the first actuator electrode subunit, the actuator electrode is predeflected with respect to the stator electrode along a first direction in which the first actuator electrode subunit is situated with respect to the second separating layer, and wherein the second potential is in a range between the first potential applied to the first stator electrode subunit and the third potential applied to the second stator electrode subunit and to the second actuator electrode subunit.

3. The method as recited in claim 2, wherein the actuator electrode is further deflected with respect to the stator electrode from the first end position into a second end position by decreasing a difference between the first potential applied to the first stator electrode subunit and the second potential applied to the first actuator electrode subunit.

4. The method as recited in claim 3, wherein the actuator electrode is further deflected with respect to the stator electrode from the second end position into a third end position by (i) equalizing the first potential applied to the first stator electrode subunit and the second potential applied to the first actuator electrode subunit, and (ii) increasing a difference between the third potential applied to the second stator electrode subunit and to the second actuator electrode subunit and the first potential applied to the first stator electrode subunit.

5. The method as recited in claim 1, wherein, by applying the first potential to the first stator electrode subunit, the actuator electrode is predeflected with respect to the stator electrode along a second direction in which the second actuator electrode subunit is situated with respect to the second separating layer, and wherein the first potential is in a range between the second potential applied to the first actuator electrode subunit and the third potential applied to the second stator electrode subunit and to the second actuator electrode subunit.

6. A method for operating an electrostatic drive having a stator electrode and an actuator electrode each configured as a multilayer electrode, wherein at least one first separating layer subdivides the stator electrode into at least one first stator electrode subunit and one second stator electrode subunit, and wherein at least one second separating layer subdivides the actuator electrode into at least one first actuator electrode subunit and one second actuator electrode subunit, and wherein the actuator electrode in a non-energized starting position, without a voltage applied between the stator electrode and the actuator electrode, is situated with respect to the stator electrode in such a way that the first actuator electrode subunit is a shorter distance away from the first stator electrode subunit than the second actuator electrode subunit, the method comprising:
predeflecting the actuator electrode with respect to the stator electrode from the non-energized starting position of the actuator electrode into an end position in which the actuator electrode is situated with respect to the stator electrode in such a way that a first distance between the first actuator electrode subunit and the second stator electrode subunit is smaller than a second distance between the second actuator electrode subunit and the first stator electrode subunit; and
further deflecting the actuator electrode with respect to the stator electrode so that the first distance between the first actuator electrode subunit and the second stator electrode subunit is reduced, and the second distance between the second actuator electrode subunit and the first stator electrode subunit is increased, by performing the following:
applying a first potential to the first stator electrode subunit and to the first actuator electrode subunit;
applying a second potential, which is different from the first potential, to the second stator electrode subunit and to the second actuator electrode subunit; and
increasing a difference between the first potential and the second potential.

7. The method as recited in claim 6, wherein for predeflecting the actuator electrode with respect to the stator electrode, the stator electrode is coupled to a secondary stator electrode, and the actuator electrode is coupled to a secondary actuator electrode, in such a way that the actuator electrode is displaced with respect to the stator electrode by displacing the secondary actuator electrode with respect to the secondary stator electrode, and a deflection voltage which is not equal to zero is applied between the secondary actuator electrode and the secondary stator electrode to displace the secondary actuator electrode.

8. A method for operating an electrostatic drive, having a stator electrode and an actuator electrode each configured as a multilayer electrode, wherein at least one first separating layer subdivides the stator electrode into at least one first stator electrode subunit and one second stator electrode subunit, and wherein at least one second separating layer subdivides the actuator electrode into at least one first actuator electrode subunit and one second actuator electrode subunit, and wherein one of the actuator electrode or the stator electrode includes at least one third separating layer situated at one of the first stator electrode subunit or the first actuator electrode subunit, the third separating layer separating one of the first stator electrode subunit or the first actuator electrode subunit from a further electrode subunit, and wherein the actuator electrode in a non-energized starting position, without a voltage applied between the stator electrode and the actuator electrode, is situated with respect to the stator electrode in such a way that the first actuator electrode subunit is a shorter distance away from the first stator electrode subunit than the second actuator electrode subunit, the method comprising:
- predeflecting the actuator electrode with respect to the stator electrode from the non-energized starting position of the actuator electrode into an end position by performing the following:
- applying a first potential to the first stator electrode subunit and to the first actuator electrode subunit;
- applying a second potential, which is different from the first potential, to the second stator electrode subunit and to the second actuator electrode subunit; and
- applying a third potential, which is different from the second potential, to the further electrode subunit.

9. An electrostatic drive, comprising:
- a stator electrode and an actuator electrode each configured as a multilayer electrode, wherein at least one first separating layer subdivides the stator electrode into at least one first stator electrode subunit and one second stator electrode subunit, and wherein at least one second separating layer subdivides the actuator electrode into at least one first actuator electrode subunit and one second actuator electrode subunit; and
- a control device configured to apply potentials to the first stator electrode subunit, the second stator electrode subunit, the first actuator electrode subunit, and the second actuator electrode subunit;
- wherein the actuator electrode in a non-energized starting position, without a voltage applied between the stator electrode and the actuator electrode, is situated with respect to the stator electrode in such a way that the first actuator electrode subunit is a shorter distance away from the first stator electrode subunit than the second actuator electrode subunit;
- and wherein the control device is configured to apply in a first operating mode (i) a first potential to the first stator electrode subunit, (ii) a second potential, which is different from the first potential, to the first actuator electrode subunit, and (iii) a third potential, which is different from the first potential and the second potential, to the second stator electrode subunit and to the second actuator electrode subunit.

10. The electrostatic drive as recited in claim 9, wherein the control device is configured to reduce, in a second operating mode, a difference between the first potential applied to the first stator electrode subunit and the second potential applied to the first actuator electrode subunit.

11. The electrostatic drive as recited in claim 10, wherein the control device is configured to perform the following in a third operating mode: (i) equalize the first potential applied to the first stator electrode subunit and the second potential applied to the first actuator electrode subunit; and (ii) increase a difference between the third potential applied to the second stator electrode subunit and to the second actuator electrode subunit and the first potential applied to the first stator electrode subunit.

12. The electrostatic drive as recited in claim 11, wherein the control device is configured such that:
- when the actuator electrode is predeflected with respect to the stator electrode from the non-energized starting position into a first end position, the control device switches to the first operating mode;
- when the actuator electrode is further deflected with respect to the stator electrode from the first end position into a second end position, the control device switches to the second operating mode; and
- when the actuator electrode is further deflected with respect to the stator electrode from the second end position into a third end position, the control device switches to the third operating mode.

13. An electrostatic drive, comprising:
- a stator electrode and an actuator electrode each configured as a multilayer electrode, wherein at least one first separating layer subdivides the stator electrode into at least one first stator electrode subunit and one second stator electrode subunit, and wherein at least one second separating layer subdivides the actuator electrode into at least one first actuator electrode subunit and one second actuator electrode subunit; and
- a control device configured to apply potentials to the first stator electrode subunit, the second stator electrode subunit, the first actuator electrode subunit, and the second actuator electrode subunit;
- wherein the actuator electrode in a non-energized starting position, without a voltage applied between the stator electrode and the actuator electrode, is situated with respect to the stator electrode in such a way that the first actuator electrode subunit is a shorter distance away from the first stator electrode subunit than the second actuator electrode subunit;
- and wherein the control device is configured to perform the following in a first operating mode: (i) apply a first potential to the first stator electrode subunit and the first actuator electrode subunit, (ii) apply a second potential, which is different from the first potential, to the second stator electrode subunit and to the second actuator electrode subunit, and (iii) increase a difference between the first potential and the second potential.

14. The electrostatic drive as recited in claim 13, further comprising:
- a secondary stator electrode coupled to the stator electrode; and
- a secondary actuator electrode coupled to the actuator electrode, the actuator electrode being displaceable with respect to the stator electrode by displacing the secondary actuator electrode with respect to the secondary stator electrode;
- wherein the control device is configured to apply, in a further operating mode, a deflection voltage which is not equal to zero between the secondary actuator electrode and the secondary stator electrode in order to displace the secondary actuator electrode with respect to the secondary stator electrode.

15. An electrostatic drive, comprising:
- a stator electrode and an actuator electrode each configured as a multilayer electrode, wherein at least one first separating layer subdivides the stator electrode into at least one first stator electrode subunit and one second stator electrode subunit, and wherein at least one second separating layer subdivides the actuator electrode into at least one first actuator electrode subunit and one second actuator electrode subunit, and wherein one of the actuator electrode or the stator electrode includes at least one third separating layer situated at one of the first stator electrode subunit or the first actuator electrode subunit, the third separating layer separating one of the first stator electrode subunit or the first actuator electrode subunit from a further electrode subunit; and
- a control device configured to apply potentials to the first stator electrode subunit, the second stator electrode subunit, the first actuator electrode subunit, the second actuator electrode subunit, and the further electrode subunit;

wherein the actuator electrode in a non-energized starting position, without a voltage applied between the stator electrode and the actuator electrode, is situated with respect to the stator electrode in such a way that the first actuator electrode subunit is a shorter distance away from the first stator electrode subunit than the second actuator electrode subunit;

and wherein the control device is configured to apply in a first operating mode (i) a first potential to the first stator electrode subunit and the first actuator electrode subunit, (ii) a second potential, which is different from the first potential, to the second stator electrode subunit and to the second actuator electrode subunit, and (iii) a third potential, which is different from the second potential, to the further electrode subunit.

\* \* \* \* \*

UNITED STATES PATENT AND TRADEMARK OFFICE
CERTIFICATE OF CORRECTION

PATENT NO.        : 8,629,635 B2                                              Page 1 of 1
APPLICATION NO.   : 12/998669
DATED             : January 14, 2014
INVENTOR(S)       : Pirk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 317 days.

Signed and Sealed this
Twenty-second Day of September, 2015

Michelle K. Lee
*Director of the United States Patent and Trademark Office*